United States Patent [19]

Masaki

[11] Patent Number: 4,945,291

[45] Date of Patent: Jul. 31, 1990

[54] LAMP-LIGHTING DEVICE

[75] Inventor: Kazumi Masaki, Osaka, Japan

[73] Assignee: Ken Hayashibara, Okayama, Japan

[21] Appl. No.: 182,865

[22] Filed: Apr. 12, 1988

[30] Foreign Application Priority Data

Apr. 18, 1987 [JP] Japan .................................. 62-95933

[51] Int. Cl.[5] .............................................. H05B 39/04

[52] U.S. Cl. .................................... 315/307; 315/205; 315/208; 315/362

[58] Field of Search ............... 315/205, 208, 199, 307, 315/194, DIG. 5, 362, 291

[56] References Cited

U.S. PATENT DOCUMENTS 4,158,792 6/1979 Kuroi et al. ............................ 315/86
4,293,796 10/1981 McMorrow ........................ 315/205
4,523,131 6/1985 Zansky ............................... 315/307
4,563,616 1/1986 Stevens ................................ 315/220
4,777,409 10/1988 Tracy et al. .................... 315/200 R

FOREIGN PATENT DOCUMENTS 2574613 12/1985 France .

*Primary Examiner*—Eugene R. LaRoche
*Assistant Examiner*—N. McCutcheon
*Attorney, Agent, or Firm*—Browdy and Neimark

[57] ABSTRACT

Disclosed is a novel lamp-lighting device, comprising a full-wave rectifier having both an input terminal connected with an ac source and an output terminal connected with a lamp, a smoothing means connected in parallel with the lamp, means to detect a voltage across the lamp that exceeds a prescribed level, means to switch the operation of said rectifier to half-wave rectification mode, and means to connect said switching means with said detecting means.

7 Claims, 2 Drawing Sheets

CH
D1
D4
AC
S
L
D2
D3
R1
ZD
C1
Z
K

LAMP-LIGHTING DEVICE

BACKGROUND OF THE INVENTION

1. Field of the invention

The present invention relates to a lamp-lighting device, specifically, to that which supplies a direct current obtained by rectifying an alternating current with full-wave rectifier and smoothing means to a lamp.

2. Description of the prior art

Recently, various flickerless illuminating devices that are easy on the eye when used for hours have been developed, and some of them have been commercialized.

The present inventor discloses in Japanese Patent Laid-Open No. 193,398/86, Japanese Patent Laid-Open No. 185,516/87 and Japanese Utility Model Laid-Open No.278,782/86 that, when lighted with a direct current obtained by rectifying an alternating current with combination of full-wave rectifier and smoothing means, a lamp provides a flickerless illumination that is easier on the eye even when used for hours than that attained by energization of an alternating current.

Although such conventional lamp-lighting device attains a satisfactory illumination, it has the drawback that, when conventional ac 100 volts is used, it may extremely shorten lamp life because a direct current obtained by rectifying conventional ac 100 volts with such combination elevates the voltage across filament up to 140 volts at maximum that is 140% higher than its rating.

SUMMARY OF THE INVENTION

In view of the foregoing, the present inventor investigated various means that overcome this drawback of conventional lamp-lighting device.

As a result, the present inventor found that the drawback can be overcome by equipping to conventional lamplighting device (i) means to detect a voltage across the lamp that exceeds a prescribed level, (ii) means to switch the operation of said rectifier to half-wave rectification mode, and (iii) means to connect said switching means with said detecting means.

More particularly, the present invention relates to a lamp-lighting device which supplies a direct current obtained by rectifying an alternating current with full-wave rectifier and smoothing means to a lamp, characterized in that it comprises means to detect a voltage across the lamp that exceeds a prescribed level: means to switch the operation of said rectifier to half-wave rectification mode; and means to connect said switching means with said detecting means.

DESCRIPTION OF THE PREFERRED EMBODIMENTS

The present invention will hereinafter be explained with reference to the accompanying drawings, in which.

Throughout the figures, symbol AC designates ac source, $D_1$–$D_4$, diodes SCR, thyristor: S, relay contact:

L, relay coil: ZD, voltage regulation diode: $R_1$–$R_3$, resistors: $C_1$–$C_4$, capacitors; VR, variable resistance; Z, lamp: K, surgelimiting means; and CH, choke coil.

Figure 1:
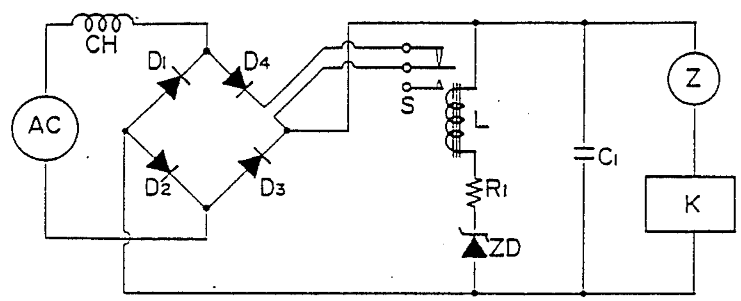
FIG. 1 is the circuit of an embodiment according to the invention.

FIG. 1 is the circuit of an embodiment according to the invention, wherein the input terminal of a full-wave bridge rectifier consisting of diodes $D_1$, $D_2$, $D_3$ and $D_4$ is connected with ac source AC through choke coil CH so that the current from ac source AC is rectified by the full-wave bridge rectifier in full-wave mode, smoothed by smoothing capacitor $C_1$, and supplied to lamp Z. Diode $D_4$ in the bridge rectifier is connected with relay contact S, while magnetic coil L is connected with the output terminal of the bridge rectifier through resistor $R_1$ and voltage regulation diode ZD. The use of choke coil CH is to limit and quickly stop an arc discharge current that may arise when the filament of lamp Z is burned out, in order to prevent the damage of circuit elements. Symbol K designates conventional-type surge-limiting means that can be assembled in the present device, if necessary. The surge-limiting circuits and devices disclosed by the present inventor, for example, in Japanese Patent Laid-Open Nos. 215,696/84, 230,298/84, 518/85, 82,700/86, 165,997/86 and 193,398/86, can be advantageously used as surge limiting means The operation of this embodiment is now explained. Since this embodiment is arranged in this way, when capacitor $C_1$ preset to give dc 120 volts across lamp Z is used in combination with voltage regulator diode ZD effecting a regulation voltage of 120 volts, no current flows across relay coil L and resistor $R_1$ whenever the voltage across lamp Z is lower than 120 volts. While immediately after the voltage exceeds 120 volts a current flows into relay coil L to open contact S so that diode $D_4$ is removed from the full-wave bridge rectifier. Thus, an alternating current from ac source AC is rectified by diodes $D_1$ and $D_3$ in half-wave mode, smoothed with capacitor $C_1$, and supplied to the main current path including lamp Z. Since, when the same ac source and smoothing capacitor are used commonly, the output voltage by half-wave rectification is lower than that obtained by full-wave rectification, the voltage across lamp Z quickly decreases to the prescribed level.

Figure 2:
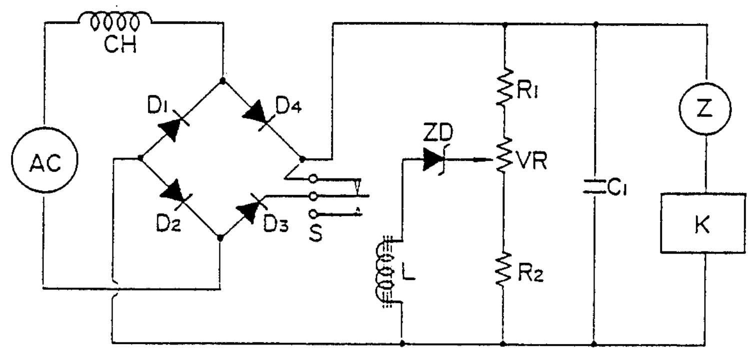
FIG. 2 is the circuit of another embodiment according to the invention.

FIG. 2 is the circuit of another embodiment according to the invention, wherein the voltage across capacitor $C_1$ is appropriately divided by resistor $R_1$ and variable resistance VR, and then supplied to a series circuit consisting of relay coil L and voltage regulation diode ZD.

More particularly, this embodiment is arranged in such manner that the upper limit of the voltage across lamp Z can be freely selected by controlling the voltage across the series circuit with variable resistance VR. Thus, when the upper limit is preset, for example, to 110 volts, lamp Z is usually energized with a voltage obtained by smoothing with capacitor $C_1$ the full-wave output of the bridge rectifier consisting of diodes $D_1$, $D_2$, $D_3$ and $D_4$. While since, if the voltage across lamp Z exceeds 110 volts, voltage regulation diode ZD is triggered to actuate relay coil L, the main current path including lamp Z is energized with a voltage obtained by smoothing with capacitor $C_1$ the half-wave output of diodes $D_2$ and $D_4$. Thus, the voltage across lamp Z quickly decreases to the prescribed level.

Figure 3:
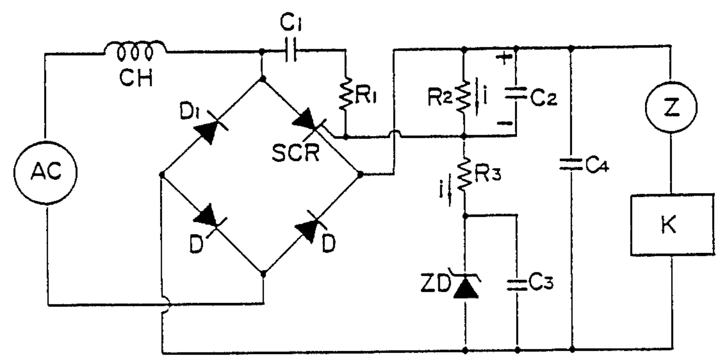
FIG. 3 is the circuit of still another embodiment according to the invention.

FIG. 3 is the circuit of still another embodiment according to the invention, wherein diodes $D_1$, $D_2$, $D_3$ and thyristor SCR provides a full-wave bridge rectifier, while the gate of thyristor SCR is connected in such manner that it is energized with an alternating current through capacitor $C_1$ and resistor $R_1$. The output terminal of the full-wave bridge rectifier is connected with capacitor $C_4$ that acts as the smoothing means, a series circuit consisting of resistors $R_2$ and $R_3$, and voltage regulation diode ZD so that the gate of thyristor SCR is energized with the voltage across resistor $R_2$.

Since this embodiment is arranged in this way, if the voltage across lamp Z exceeds the regulation voltage of voltage regulation diode ZD, the current (i) through resistor $R_2$ causes a voltage drop ($R_2 \times i$) that is then supplied to the gate of thyristor SCR to retain its cathode and gate respectively positive and negative, as well as to render thyristor SCR cutoff. When this occurs, the half-wave output by diodes $D_1$, $D_2$ and $D_3$ is smoothed by capacitor $C_4$, and supplied to the main current path including lamp Z. Thus, the voltage across lamp Z quickly decreases to the prescribed level.

Figure 4:
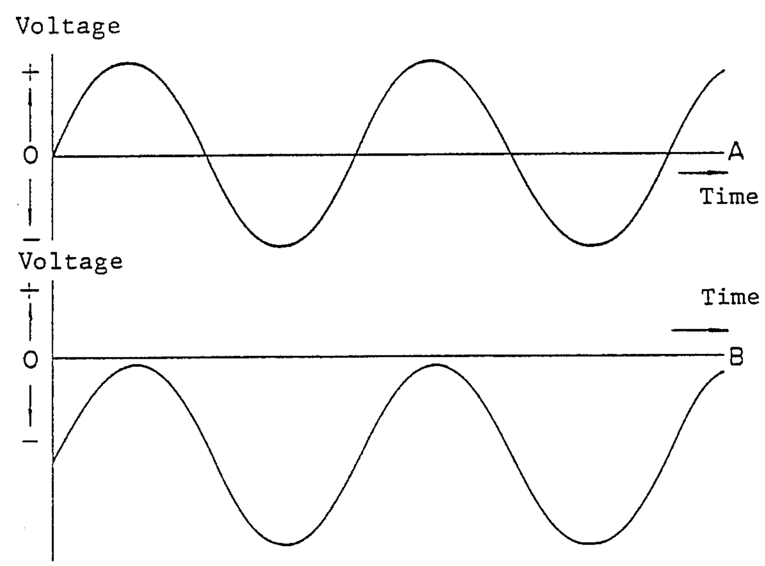
FIG. 4 is the waveform as observed in the circuit in FIG. 3.

If the voltage across lamp Z is at half of the prescribed level or lower than it, the gate of thyristor SCR is energized with an alternating current as shown in FIG. 4(A) to leave thyristor SCR conductive so that the full-wave output of the bridge rectifier is smoothed by capacitor $C_4$, and supplied to lamp Z. If the voltage across lamp Z exceeds the regulation voltage of voltage regulation diode ZD to permit a current to flow in resistor $R_2$, the voltage energized to the gate of voltage regulation diode ZD is clamped to negative direction as shown in FIG. 4(B) to suspend the conduction of thyristor. When this occurs, the half-wave output by diodes $D_1$ and $D_2$ is smoothed by capacitor $C_4$, and supplied to the main current path including lamp Z. Thus, the voltage across lamp Z quickly decreases to the prescribed level.

As described above, the present lamp-lighting device never supplies a voltage exceeding a prescribed level to a lamp because in the invention a device which can supply a direct current obtained by rectifying an alternating current with full-wave rectifier and smoothing means to a lamp is equipped with means to detect a voltage across the lamp that exceeds the prescribed level: means to switch the operation of said rectifier to half-wave rectification mode; and means to connect said switching means with said detecting means.

Furthermore, one lamp can be used without causing burn-out over a relatively long time because the present device supplies no voltage exceeds a prescribed level to the lamp.

In addition, since one lamp can be used over a relatively long time when lighted with the present device, the care for exchanging lamps can be reduced.

The present invention attaining such remarkable effects would make a great contribution to the art.

Having described specific embodiments of my bearing, it is believed obvious that modification and variation of my invention are possible in light of the above teachings.

I claim:

1. A device for lighting an incandescent lamp, consisting of:

a full-wave rectifier having both an input terminal connected with an ac source and an output terminal connected with an incandescent lamp;

a smoothing means connected in parallel with the incandescent lamp;

a detecting means to monitor a voltage across the incandescent lamp; and means to switch the operation of said rectifier to half-wave rectification mode, said switching means switching the operation of said rectifier to half-wave rectification mode in order to decrease a voltage across the incandescent lamp to a prescribed level when a voltage across the incandescent lamp exceeds the prescribed level and is detected by said detecting means; and means to connect said switching means with said detecting means.

2. The device of claim 1, wherein said detecting means comprises a voltage regulation diode.

3. The device of claim 1, wherein said connecting means is a magnetic relay.

4. The device of claim 1, wherein said full-wave rectifier consists of diodes.

5. The device of claim 1, wherein said full-wave rectifier consists of diodes and a thyristor.

6. The device of claim 1, wherein a surge-limiting means is connected in series with the lamp.

7. The device of claim 1, wherein a choke coil is connected with the input terminal of the full-wave rectifier.

* * * * *